United States Patent [19]

Moore et al.

[11] Patent Number: 4,524,325
[45] Date of Patent: Jun. 18, 1985

[54] DUAL GUARD TYPE RESISTIVITY MEASURING APPARATUS

[75] Inventors: Robert A. Moore; Edward P. Karisch, both of Houston, Tex.

[73] Assignee: Halliburton Company, Duncan, Okla.

[21] Appl. No.: 431,539

[22] Filed: Sep. 30, 1982

[51] Int. Cl.³ .............................. G01V 3/24
[52] U.S. Cl. .................................. 324/375
[58] Field of Search ................ 324/371, 375

[56] References Cited

U.S. PATENT DOCUMENTS

| | | | |
|---|---|---|---|
| 1,862,158 | 6/1932 | O'Keeffe | 335/129 |
| 1,878,657 | 9/1932 | Ainsworth | 335/201 |
| 2,834,848 | 5/1958 | Ellwood | 335/133 |
| 2,880,389 | 3/1959 | Ferre et al. | 324/375 |
| 2,900,470 | 8/1959 | Egerer | 200/16 A |
| 3,075,142 | 1/1963 | Albright et al. | 324/375 |
| 3,219,921 | 11/1965 | Bricaud | 324/371 |
| 3,262,050 | 7/1966 | Threadgold et al. | 324/375 |
| 3,390,323 | 6/1968 | Kisling | 324/375 |
| 3,660,755 | 5/1972 | Janssen | 324/375 |
| 4,122,387 | 10/1978 | Ajam et al. | 324/375 |

Primary Examiner—Gerard R. Strecker
Attorney, Agent, or Firm—W. J. Beard

[57] ABSTRACT

In a dual guard type resistivity logging apparatus, the improvement having the preferred and illustrated form of a short guard electrode pair for making shallow resistivity measurements in a formation is disclosed; a long guard electrode pair is also incorporated for making deep resistivity measurements. The long and short guard pairs are driven by separate oscillators operating at the same frequency or at different frequencies. An electronic switch driven at a low frequency selectively connects the current emitting electrodes to a current return electrode for both long and short guard pair electrodes. The electronic switch empowers one measuring system to operate while the other is inoperative. The switching frequency at is typically of 20-40 Hertz. This enables both measuring systems to provide essentially continuous data in light of the dynamics of the use of such a log, and yet furnishes the two formation current signals wherein the operation of one resistivity measuring system does not interfere with the other resistivity system. A single electrode is used as the return current electrode, and a single voltage reference electrode on the tool is a reference electrode for voltage measurements by both measurement systems.

6 Claims, 1 Drawing Figure

DUAL GUARD TYPE RESISTIVITY MEASURING APPARATUS

BACKGROUND OF THE DISCLOSURE

A related apparatus is set out in U.S. Pat. No. 4,122,387. The disclosure set forth hereinbelow is an improvement over the mentioned reference. This apparatus utilizes digital circuitry to operate in a markedly different fashion to implement a shallow and deep resistivity measurement system. As set forth in the reference, a knowledge of the resistivity of the formation surrounding a borehole has great value. The resistivity is one of the key electrical properties which may vary laterally from the borehole, such variations in the lateral dimension being very useful in determining the nature and physical characteristics of the formation. As set forth in the reference, a deep measurement (that is relatively remote laterally from the borehole) yields apparent formation resistivity of the nearly uninvaded character. A different measurement is obtained from the shallow lateral depths, that is, those much closer to the borehole. This yields the resistivity of the invaded zone of the formation. Extremely shallow measurements of resistivity in the formation yield flushed zone resistivity. As will be understood, the three resistivities (in absolute and comparative terms) yield useful information for the evaluation of the formation.

As pointed out in the reference, variations in resistivity may indicate hydrocarbon migration in the formation in near vicinity of the borehole. Other valuable information can also be obtained from resistivity measurements. It is highly desirable therefore to have a common resistivity measurement apparatus on a sonde to be lowered in a borehole which measures laterally at relatively shallow and relatively deep distances. Guard electrode systems are positioned around current emitting electrodes on the sonde to focus the current flow through the conductive borehole fluid and thereby force the current flow to a desired depth in the formation.

Shallow penetration is obtained from a current emitting electrode with relatively short guard electrodes adjacent to it. The guard electrodes are arranged as a flanking pair. A similar but separate system is also included to direct the current flow much more deeply into the formation. This is accomplished by deploying a second pair of longer electrodes. The distance the current flows into the earth formation is a function of the length of the guard electrodes. A relatively long pair of guard electrodes provides greater lateral penetration. A shorter pair of electrodes has less lateral penetration. In fact, the penetration is, within limits, related to the size and spacing of the electrodes of the measuring system.

Resistivity is indicated by Ohm's Law. It is difficult to completely separate the currents which occur with two simultaneously operated current emitting electrode systems. Physical displacement of the two reduces electrode array interaction to some degree when the two are operated simultaneously. This interaction makes it difficult to achieve accurate shallow and deep measurements. For each measurement, it is necessary to determine the particular current flow from current emitting electrodes and voltage difference of the electrode with respect to a reference electrode. The four measurements required to obtain deep and shallow resistivity determinations cannot always be accurately obtained by physical displacement of the measuring systems along a common tool. However, in spite of the interaction, it is highly advantageous to operate two measuring systems on a common sonde because this reduces drilling interruption. Thus, with the device mentioned in the reference, the simultaneous operation of the deep and shallow measuring systems is achieved with some loss of accuracy.

One feature of the present apparatus is that the two resistivity measurements are made in separate discrete time intervals. Even so, there is no gap or omission of data because deep and shallow measurements are made at a rate that is sufficiently fast to accurately depict the subsurface earth formation features.

BRIEF SUMMARY OF THE INVENTION

With the foregoing in mind, this apparatus is summarized as two simultaneously operated resistivity measurement electrode systems, one being flanked by short guard electrodes and the other being flanked by long guard electrodes to thereby achieve shallow and deep resistivity investigations radially or laterally from a borehole. The two different spaced guard electrode systems are operated with separate oscillators for driving the current emitting and guard electrodes. They are preferably operated at relatively high frequencies compared to the switching rate of the electronic switch. The oscillators are connected through the electronic switch to the current return electrode. The electronic switch is cycled at a low frequency rate, of 20–40 Hertz. This frequency enables the switch to operate the two electrode systems alternately in a repetitive fashion. This alternation of operation precludes interaction of one electrode array with the other.

BRIEF DESCRIPTION OF THE DRAWINGS

So that the manner in which the above recited features, advantages and objects of the present invention are attained and can be understood in detail, more particular description of the invention, briefly summarized above, may be obtained by reference to the embodiments thereof which are illustrated in the appended drawing.

It is to be noted, however, that the appended drawing illustrates only a typical embodiment of this invention and is therefore not to be considered limiting its scope, for the invention may admit to other equally effective embodiments.

Figure 1:
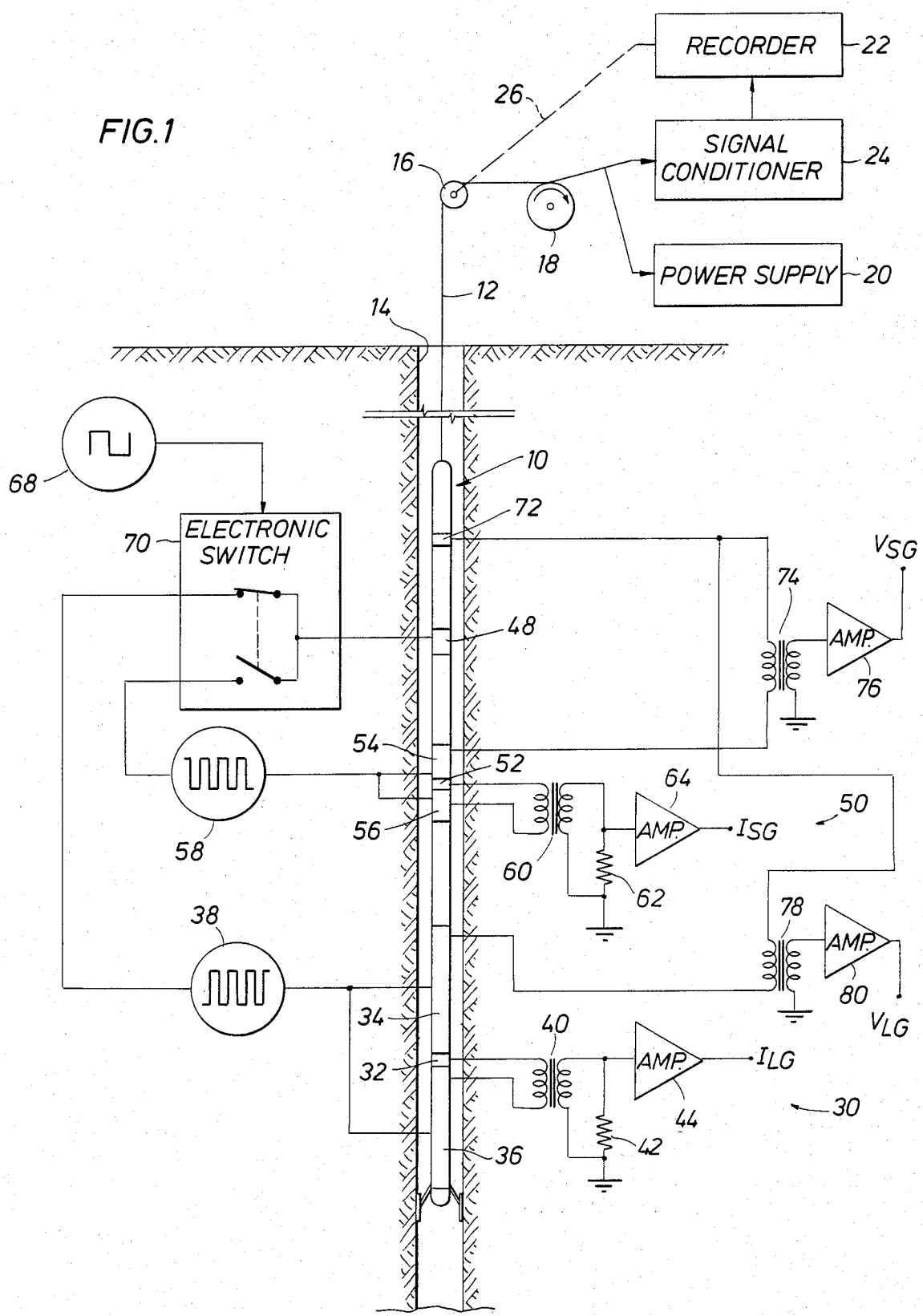

The only drawing FIGURE discloses a well logging apparatus in a borehole wherein the apparatus incorporates the improved dual guard resistivity measuring system of the present disclosure.

DETAILED DESCRIPTION OF THE PREFERRED EMBODIMENT

Attention is directed to the drawing FIGURE which shows an open fluid filled borehole extending into the earth. In the borehole, a logging sonde 10 constructed in accordance with the teachings of this disclosure is suspended on an armored logging cable 12. The borehole 14 can have any depth, the cable 12 being sufficiently long to extend into it. The logging cable 12 supports the sonde 10. It passes over a pulley 16. The cable 12 is stored on a drum 18. The cable 12 connects to a number of devices including a suitable power supply 20. Data gathered by the system is collected at a recorder 22 after it has been processed by signal conditioner 24. The recorder 22 records data relative to the depth in the borehole. To this end, there is a depth indicator 26 connected from the pulley 16 to the recorder 22 so that data can be recorded as a function of borehole depth.

The exterior of the sonde 10 has been drawn. As will be appreciated, the equipment which is represented with schematic symbols is located on the interior of the tool. Circuitry has been added to show its relative connection along the exterior of the tool, it being noted that the tool 10 has a number of external electrodes. The electrodes are electrically isolated from one another by suitable insulating material. Further, the several electrodes typically fully circumscribe the tool to enable current emission in all directions of azimuth around the tool. The sonde body is therefore an elongate insulative sleeve or housing interrupted by electrodes at spaced locations.

The sonde 10 includes a first set of equipment which is the deep resistivity measurement apparatus. This is identified in general terms by the numeral 30. It is located at the lower portion of the tool. The deep resistivity measuring apparatus includes a current emitting electrode 32. It is flanked by symmetrically constructed, preferably identical guard electrodes 34 and 36. The two guard electrodes are connected with a common AC source 38. The two are powered by the low frequency AC signals simultaneously. A common voltage signal is applied to both guard electrodes. The voltage signal which is applied to the two guard electrodes forces the current flow from the current emitting electrode 32 deeper into the formation. The depth of penetration of the current flow from the electrode 32 is thus controlled. The current penetrates deeply because the guard electrodes are relatively long.

A transformer 40 develops a voltage signal proportioned to the current emitted from the center electrode 32. The voltage across the resistor 42 proportional to current flow, is amplified by an amplifier 44. The current flow path from the electrode 32 through the borehole fluid into the formation outwardly is returned to the current return electrode 48. More will be noted regarding the operation of current return electrode 48 momentarily.

The numeral 50 identifies a shallow resistivity electrode system and related apparatus. The system and apparatus are similar in construction to the deep resistivity measuring system; it differs primarily by having shorter guard electrodes. To this end, there is a central current emitting electrode 52. That electrode is flanked above and below by identical guard electrodes 54 and 56. The guard electrodes are deployed adjacent the current emitting electrode 52. An oscillator 58 is connected to the guard electrodes to apply voltage to the guard electrodes 54 and 56 simultaneously. A current transformer 60 is connected across the central electrode and one of the guard electrodes. The secondary of the transformer is connected to a load resistor 62. The voltage developed across the load resistor is amplified by an output amplifier 64. That signal represents the current flow from the central current emitting electrode 52 into the formation.

The current emitting electrode 52 emits a current which flows radially outwardly. By virtue of the short guard electrodes 54 and 56, a shallower resistivity measurement is performed than the measurement made with electrodes 32, 34 and 36. The measurement may be described as a shallow depth of investigation electrode system, and provides a measure of resistivity in the invaded zone of the formation adjacent to the borehole.

An oscillator 68 connected to an electronic switch 70 controls the completion of the circuit for the current return. The current return electrode 48 is connected to either of the oscillators 38 or 58 through switch 70. The current return flow path is alternately switched so that one of the two current paths is switched on (switch closed) while the other is switched off (switch open). To summarize, the current return electrode 48 is common to both systems. That is, current flowing into the earth formations surrounding the borehole is returned to the well logging sonde 10 at the current electrode 48. This electrode is therefore switched into the current circuit by the switch 70. It completes the current flow path, there being a connection from the current return electrode 48 to the two current emitting electrodes 32 and 52.

The numeral 72 identifies a voltage reference electrode. This electrode is the reference point for the voltages to be measured. This electrode is positioned on the sonde 10 or on an insulating sleeve of the well logging cable 12. The primary of transformer 74 is connected between electrode 72 and guard electrode 54 of the short guard electrode array. The potential difference between the short guard electrodes and the voltage reference electrode is coupled via transformer 74 to a voltage amplifier 76 whose output is a signal termed the short guard voltage signal.

The primary of transformer 78 is connected to the long guard electrode 34 and the voltage reference electrode 72. The potential difference across the primary of transformer 78 is coupled to an amplifier 80 whose output is termed the long guard voltage signal.

Thus, the system forms four outputs: long and short guard voltage signals and long and short guard current signals from electrodes 32 and 52. Each guard electrode system has two outputs, a current and voltage signal, and the resistivity is proportional to the voltage signal to current signal ratio. The factor of proportionality is dependent on the lengths of the two measurement electrode systems. The spacings between electrodes, the borehole diameter, and the resistivity of the borehole fluid within which the sonde 10 is immersed also influences the proportionality factor.

This arrangement enables the equipment to form output signals indicative of resistivity at two different lateral distances from the borehole. As can be seen, the four outputs are in the form of voltage levels from amplifiers 44, 64, 76, 80. The amplifiers provide amplification and feed the output signals to the surface. If desired, the signals can be applied to an analog to digital converter carried in the sonde 10 and the digitally encoded signals can be relayed to the surface. An alternate approach is to actually carry out the calculations of resistivity in the sonde 10 and transmit the resistivity values to the surface equipment.

Alternate arrangements of the apparatus can be implemented. As mentioned, the reference voltage electrode 72 can be either on the sonde or on the armored cable which supports the sonde in the well bore. The current return electrode 48 can also be located on the cable. This enables the sonde 10 to be shortened. The four output signals can be furnished as analog signals, preferably through the amplifiers as illustrated, but they could also be converted to digital signals if desired. The rate at which data is created is sufficiently slow that a single A to D converter can be used for all four data inputs through suitable multiplexing. If desired, optional pad mounted resistivity devices can be affixed to the sonde 10, and other measuring tools can be mounted on the sonde. For instance, another tool might well be a borehole diameter caliper measuring device. Spacing between the long and short electrode systems might well be provided by positioning another type of logging tool on the sonde between the two electrode systems. A gamma ray or neutron logging tool exemplifies such an apparatus. One exemplary spacing is about six feet. The sonde 10 is formed with a six foot long insulative section between electrode systems 30 and 50 to increase system isolation. Alternatively, the current emitted from the measurement electrodes could be maintained constant bu appropriate control circuitry and the voltage measurements between the reference electrode and the measurement electrode would then be directly indicative of formation resistivity. Similarly, the voltage between the measurement electrodes and the reference electrode could be held constant by appropriate circuitry and the current flow between these electrodes would be directly indicative of formation conductivity. These techniques would simplify the transmission of resistivity measurements to the surface by reducing the required number of transmitted signals.

While the foregoing is directed to the preferred embodiment, scope is determined by the claims which follow.

What is claimed is:

1. A well logging apparatus for measuring electrical properties of a formation intersected by a well bore wherein the electrical properties of the formation are substantially simultaneously measured at separate shallow and deep radial distances from the borehole comprising:
   (a) a well logging sonde sized and adapted for movement along a borehole for resistivity logging of the formations adjacent said borehole;
   (b) a first guard electrode system on said sonde having plural guard electrodes for focusing current to flow through the formation to a first lateral distance from the borehole, and a first current emitting electrode situated between said guard electrodes for emitting the first current;
   (c) a second guard electrode system on said sonde having plural guard electrodes for focusing current to flow through the formation to a second different lateral distance from the borehole, and a second current emitting electrode between said guard electrodes for emitting the second current;
   (d) first electrical current source means for supplying a first guard current to said first guard electrode system;
   (e) a second electrical current source means for supplying a second guard current to said second guard electrode system;
   (f) a single return current electrode means providing current flow paths for said first and second current source means; and
   (g) switching means for alternately connecting said first electrical current source means and said second electrical current source means to their respective guard electrode systems to complete current flow paths with said single return current electrode means.

2. The apparatus of claim 1 including a current measuring means having two input terminals, one of which is connected to said first current emitting electrode, and the other terminal is connected to one of its associated guard electrodes therefor; said measuring means forming a signal indicative of the current flowing into the formation.

3. The apparatus of claim 2 including a voltage measuring means having two input terminals, one of which is connected to a guard electrode associated with said first current emitting electrode and the other terminal of which is connected to a voltage reference, said voltage measuring means forming a signal indicative of a voltage on said guard electrode with respect to said voltage reference.

4. The apparatus of claim 1 wherein said switching means for alternately connecting said first and second electric current source means and said guard electrode means includes:
   (a) an oscillator;
   (b) two state switch means having a pair of input terminals;
   (c) two current return conductors connected to the input terminals of said switch means, said conductors being separately connected to said first and second guard electrode systems to form a current flow path to said switch means; and
   (d) conductor means connected from said switch to said return current electrode means.

5. The apparatus of claim 4 including means for operating said switch means mutually exclusively between said two input current conductors.

6. The apparatus of claim 4 including a current return electrode on said sonde comprising said return current electrode means;
   (a) wherein said sonde supports an exposed voltage reference electrode; and
   (b) signal forming means connected to measure voltage relative to said voltage reference electrode and to measure current from said current emitting electrodes to obtain a measure of formation resistivity.

* * * * *